March 12, 1968 A. L. DE LISLE ET AL 3,372,803
MEANS AND METHOD FOR REMOVING IRON FROM ASBESTOS ORE
Filed July 30, 1964 5 Sheets-Sheet 2
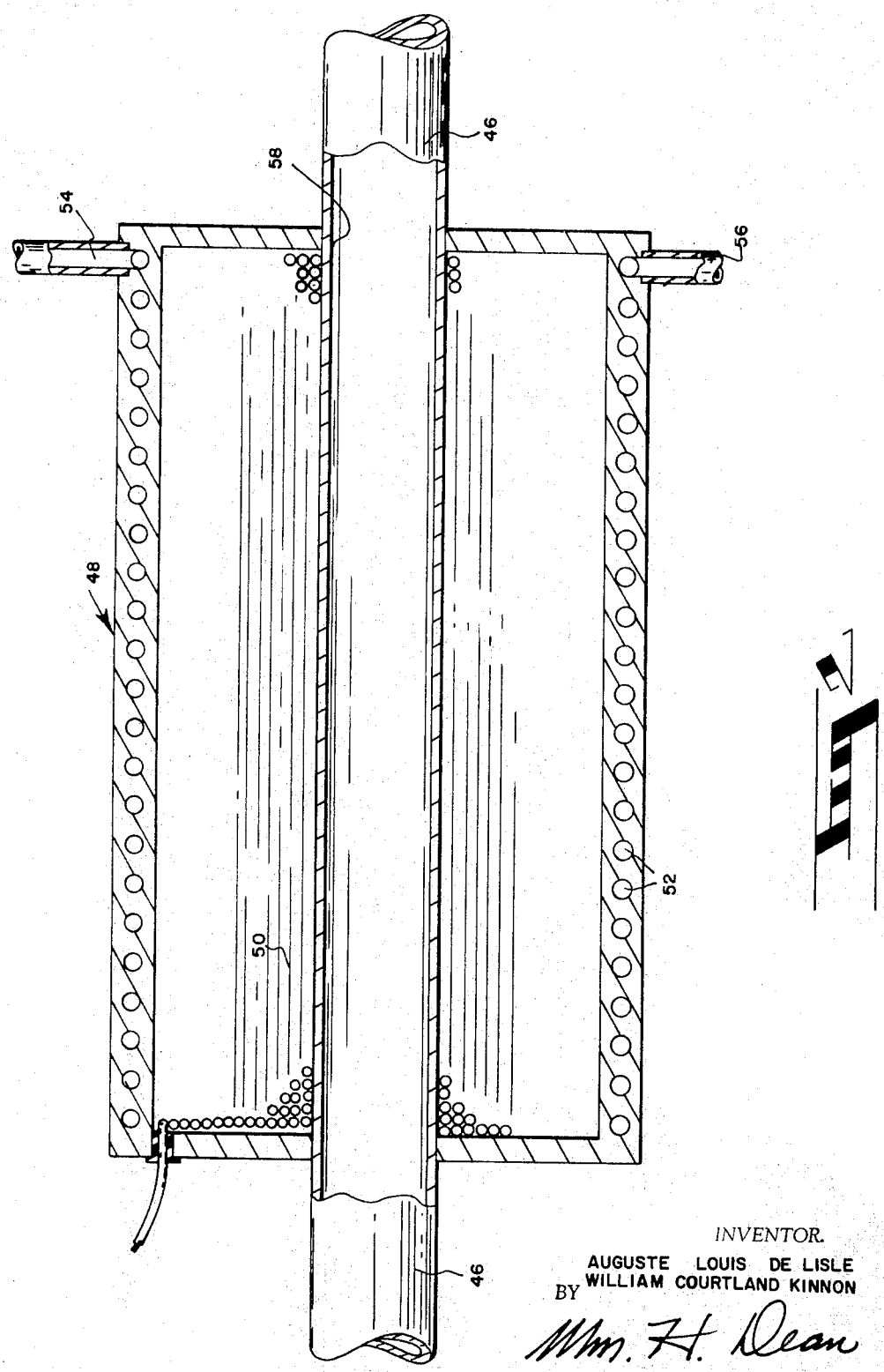
INVENTOR.
AUGUSTE LOUIS DE LISLE
BY WILLIAM COURTLAND KINNON
Wm. H. Dean

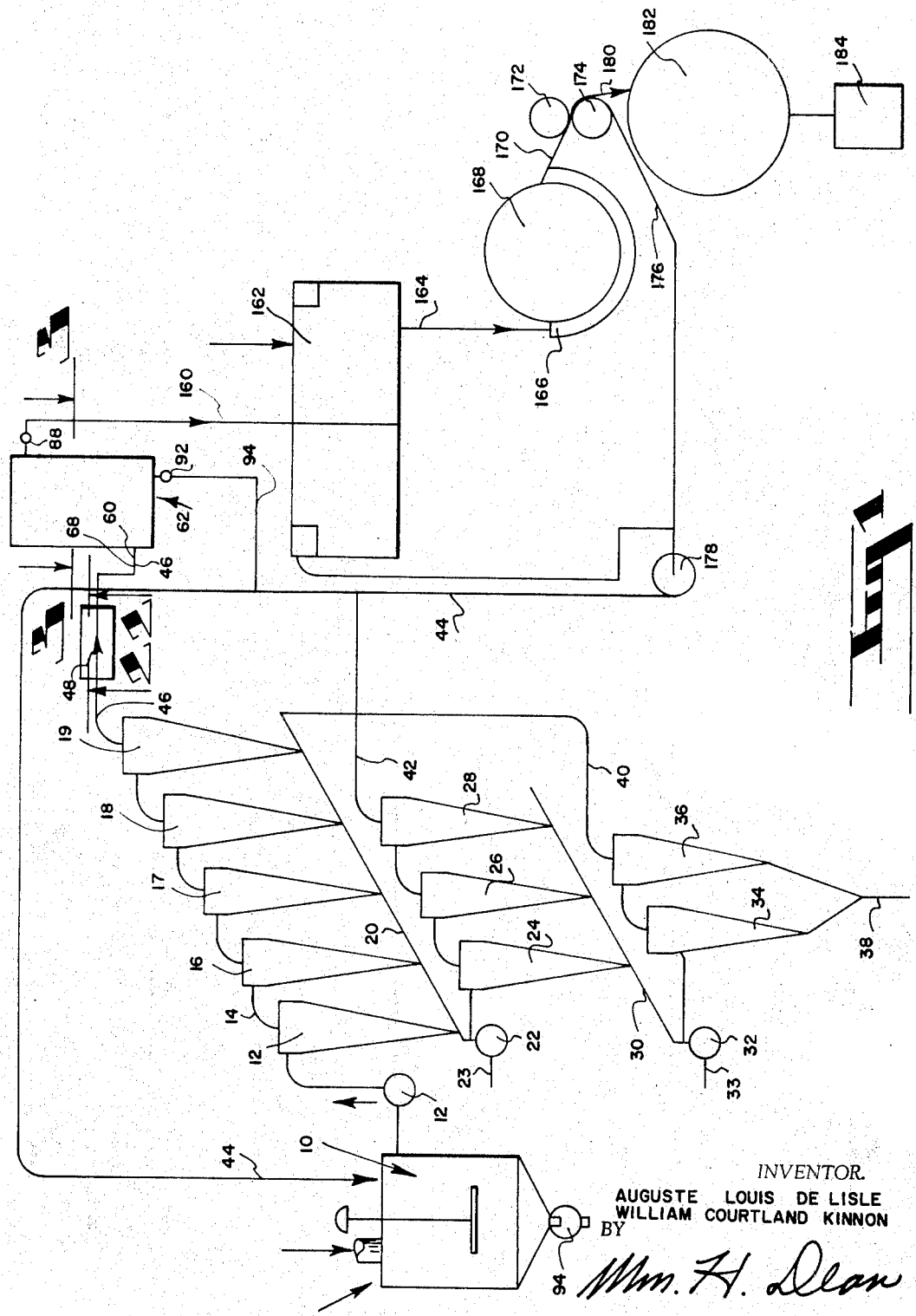

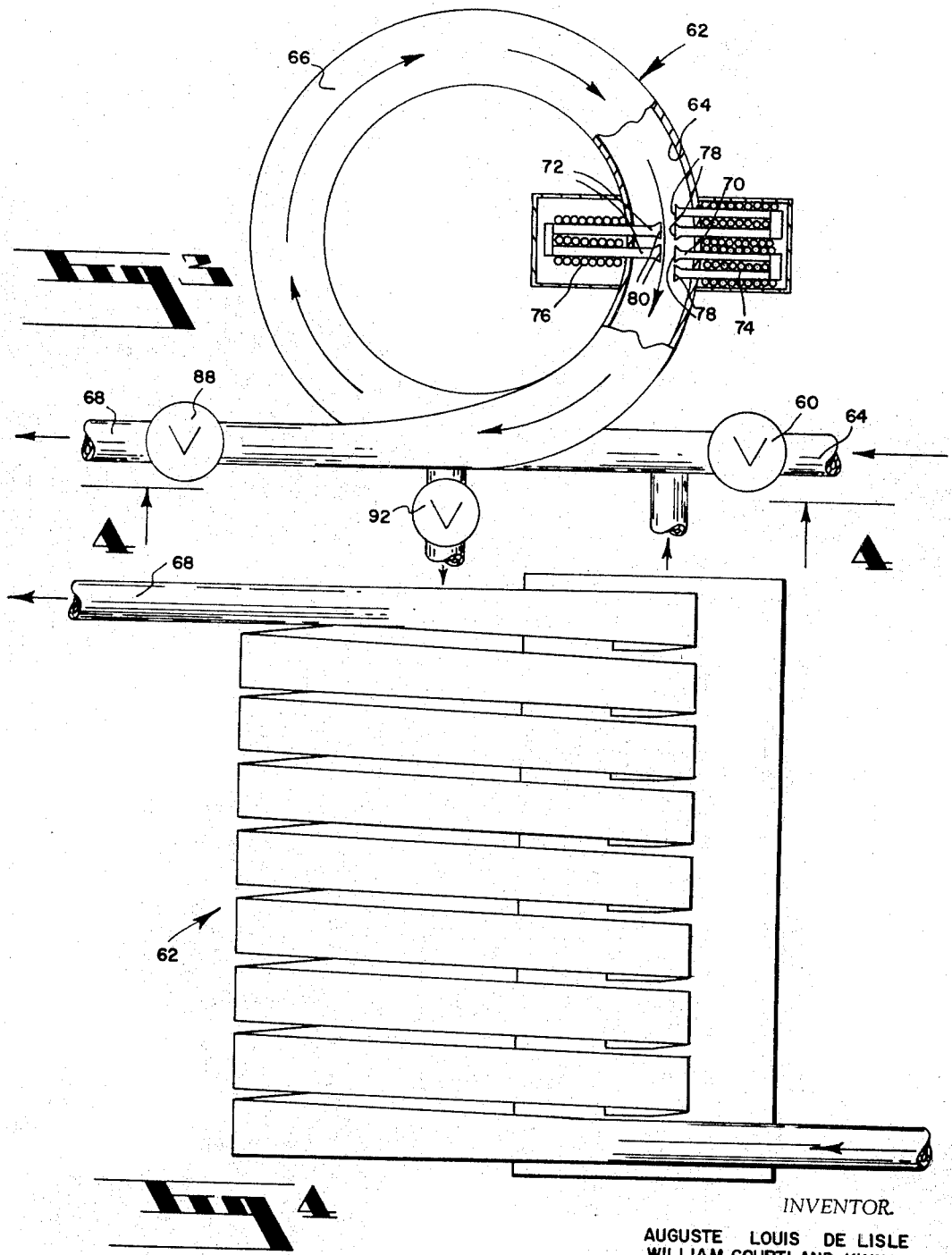

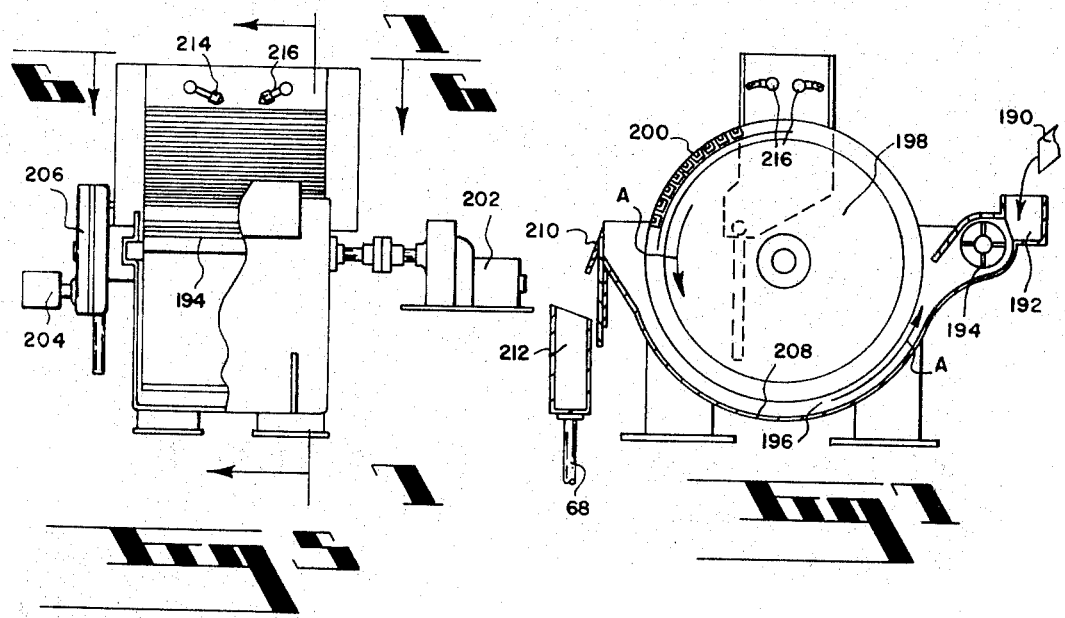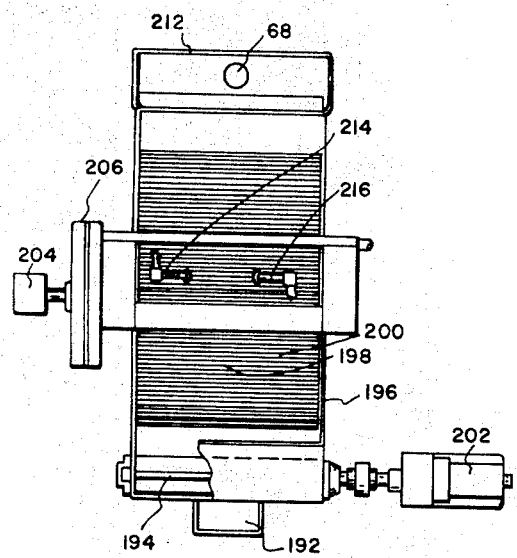

March 12, 1968  A. L. DE LISLE ETAL  3,372,803
MEANS AND METHOD FOR REMOVING IRON FROM ASBESTOS ORE
Filed July 30, 1964  5 Sheets-Sheet 5

INVENTOR.
AUGUSTE LOUIS DE LISLE
BY WILLIAM COURTLAND KINNON

Wm. H. Dean

United States Patent Office 3,372,803
Patented Mar. 12, 1968

3,372,803
MEANS AND METHOD FOR REMOVING IRON FROM ASBESTOS ORE
Auguste Louis de Lisle, Scottsdale, Ariz.; Frances S. de Lisle, executrix of said Auguste Louis de Lisle, deceased, and William Courtland Kinnon, Phoenix, Ariz., assignors to Chembestos Corporation, Phoenix, Ariz., a corporation of Arizona
Filed July 30, 1964, Ser. No. 386,226
15 Claims. (Cl. 209—5)

This invention relates to a means and method for removing iron from asbestos ore, and, more particularly, to a means and method for removing iron from asbestos ore which is particularly efficient and economical for use in processing asbestos ore to reduce the iron content therein sufficiently so that asbestos so processed may readily be used in the production of electrical insulation components and which may be used for other purposes involving refined asbestos having a very low iron content.

Heretofore it has been a problem to refine asbestos ore economically to produce what is commonly known as an electrical grade having very low iron content, as for example a content which is substantially less than three percent of the material and of which not more than two-thirds of such iron content shall be magnetite.

Of the large asbestos deposits throughout the world, only a small percentage of the asbestos ore to be obtained therefrom is low in iron content when in a natural state. Consequently, the small available supply has created unduly high prices for electrical grade asbestos and heretofore the processing of some of the asbestos from the larger deposits which contain a high percentage of iron ore has been economically undesirable. In accordance with the foregoing, the use of asbestos in the electrical industry has caused unwarranted prices as compared to those which may exist with respect to asbestos processed in accordance with the present invention. Accordingly, it is an object of the present invention to provide a means and method for removing iron from asbestos ore which is particularly adapted to the processing of various asbestos ore, including chrysotile, and which may be employed very economically to produce an electrical grade of asbestos from ore containing very substantial amounts of iron which normally renders such asbestos unusable in electrical components, particularly those requiring electrical insulation characteristics.

Another object of the invention is to provide a means and method for removing iron from asbestos ore which will economically permit the use of large available supplies of asbestos ore which may economically be mined and which may require a minimum of transportation and commercial expense as compared to present conditions wherein relatively scarce and small supplies of natural electrical grade asbestos must be shipped great distances and sold at high prices.

Another object of the invention is to provide a novel means and method for removing iron from asbestos ore wherein asbestos ore is initially pulped into a liquid slurry containing a dispersing agent and wherein the pulped asbestos in the slurry is introduced into a mechanical separator wherein specific gravity of the materials tends to separate large particles of the iron ore from the asbestos fibers, whereupon the fibers are subsequently subjected to a strong magnetic field to coalesce the small particles into larger particles, and wherein the asbestos ore in slurry form is subsequently passed into close proximity with magnets upon which the coalesced particles are collected to thereby progressively and efficiently remove a sufficient amount of the iron ore from the asbestos fibers in a slurry to render the fibers, when subsequently removed from the slurry and dried, suitable for use as an electrical insulating material.

Another object of the invention is to provide a novel means and method for removing iron from asbestos ore wherein asbestos ore is sequentially pulped and carried in a slurry through a centrifugal separator to remove the large particles of iron from the ore, then subsequently passed through an intense magnetic field to coalesce the relatively smaller particles, and then subsequently passed into impingement with magnets for collecting the coalesced particles, and then passed through means which separates the fibers from the slurry, and then passed through and between wringer rollers for removing a major portion of the liquid in the fibers and then subsequently dried to provide an end product which is very low in iron content and readily usable as an electrical grade asbestos.

Another object of the invention is to provide a means and method for removing iron from asbestos ore involving a novel magnetic iron collector capable of collecting iron from asbestos fibers which are passed through the collector in a slurry.

Another object of the invention is to provide a means and method for removing iron from asbestos ore involving a novel wringer mechanism involving a pair of rollers loaded against each other between which the wet asbestos fibers pass from a slurry to thereby remove a substantial amount of moisture therefrom and to render the drying of such fibers relatively economical.

Another object of the invention is to provide a means and method for removing iron from asbestos ore which involves a nominal capital investment in proportion to the productive capacity thereof.

Another object of the invention is to provide a means and method for removing iron from asbestos ore which is very economical to use in connection with the processing of existing readily available asbestos ore which contains a large amount of iron and magnetite.

Another object of the invention is to provide a novel means for removing iron from asbestos ore involving means for pulping and placing asbestos ore in a slurry from which the slurry and asbestos fibers are pumped into conical cyclone separators in series which removed by specific gravity the large particles of iron from the slurry and from the fibers whereby the fibers are then passed through an intense magnetic field to coalesce the relatively smaller particles, and whereupon the coalesced particles are subsequently passed into contact with magnets for directly connecting the coalesced particles from the fibers and from the slurry so that the fibers may then subsequently be separated from the slurry by a separator means and dried for delivery to the consumer.

Further objects and advantages of the invention may be apparent from the following specification, appended claims and accompanying drawings in which FIG. 1 is a diagrammatic view of a means of the invention for removing iron from asbestos ore; said means being used with method of the invention;

FIG. 2 is an enlarged axial sectional view taken from the line 2—2 of FIG. 1 showing a means for inducing an intense magnetic field around a slurry of asbestos fibers to coalesce small particles of iron;

FIG. 3 is an enlarged fragmentary sectional view of a magnetic collector of the invention taken from the line 3—3 of FIG. 1; said magnetic collector being adapted to receive an asbestos fibers slurry in contact with the magnets of the collector;

FIG. 4 is an elevational view of the magnetic collector shown in FIG. 3 and taken from the line 4—4 of FIG. 3;

FIG. 5 is a fragmentary side elevational view of a modified magnetic iron collector and specifically being a modification of the structure shown in FIGS. 3 and 4 of the drawings;

FIG. 6 is a view taken from the line 6—6 of FIG. 5;

FIG. 7 is a sectional view taken from the line 7—7 of FIG. 5;

Figure 8:
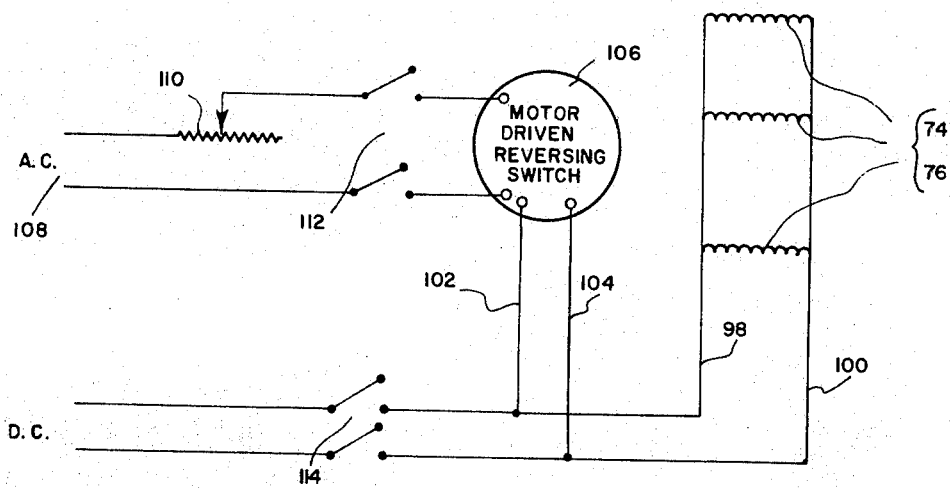
FIG. 8 is a diagrammatic view of electrical wiring showing means for intermittently alternately reversing polarity of the magnets of the magnetic collector of the invention for removing magnetized iron and magnetite particles from the magnets of the magnetic collector.

It will be apparent to those skilled in the art that the means and method of the present invention may be devoted to the removal of iron from asbestos ore for the purpose of producing electrical grade asbestos and for other equally important uses, such as the filter art and also the chemical and pharmaceutical and food beverage industries.

As shown in FIG. 1 of the drawings, the means of the invention is diagrammatically illustrated and comprises a means 10 for pulping and placing asbestos ore in a slurry form. This means 10 may comprise a container or tank wherein the ore is pulped or subsequently placed in a slurry after being pulped by any suitable mechanical means. Various devices are known in the prior art for breaking up asbestos ore and placing it in a slurry form, normally an aqueous slurry, and in accordance with the present invention the aqueous slurry may contain various free agents for dispersion purposes, such free agents may include a small amount of hydrochloric acid to establish the pH at a value below five, and preferably not below one. Further, an oxidizing agent, or an oxidizing assisting agent, such as ammonium chloride, may be added in very small amounts not to exceed two pounds per ton of the aqueous solution of asbestos and liquid, preferably water. Primarily the asbestos fiber is introduced into a solution in accordance with the foregoing at dilutions not more concentrated than a range wherein the liquid and asbestos, respectively, may be in dilutions from forty to one to one hundred to one by weight. Thus, forty parts to one hundred parts of water, for example, may be utilized to provide a slurry with one part of asbestos, respectively.

The concentration of the slurry may depend upon the entanglement of the fibers of asbestos and the length of the respective fibers.

In accordance with the invention the longer the fibers, the higher dilution is required to obtain satisfactory results.

The slurry in the container 10 is pumped at high velocity by a pump 12 from the tank 10 and into a first cyclone separator 12 wherein the slurry enters at high velocity and due to the difference in specific gravity between the slurry, the fibers and the iron particles, the iron particles and other foreign matter, such as serpentine rock, etc., are centrifugally separated and moved to the outside of the cyclone structure, while the asbestos fiber slurry is forced outwardly through an outlet conduit 14 into a second cyclone separator 16, which is also in series with succeeding similar cyclone separators 17, 18 and 19, all operating in a similar manner to the cyclone separators 12 and 16. It will be appreciated that the higher the tangential velocity of the slurry in the cyclones, the fewer number of cyclone separators are needed.

It has been found that cyclone separators having a very acute angle of about six to eight degrees provide the most satisfactory performance in accordance with the process of the invention.

Communicating with the lower ends of the cyclone separators 12, 16, 17, 18 and 19 is a conduit 20 which receives iron particles and small amounts of asbestos which have been separated from the main flow through the cyclones 12, 16, 17, 18 and 19. These iron particles and small amounts of asbestos are received from the conduit 20 by a pump 22 which pumps the removed iron particles and asbestos fibers through a series of cyclones 24, 26 and 28 which are arranged in a similar manner to the series cyclones 12, 16, 17, 18 and 19.

Communicating with the bottom portions of the cyclones 24, 26, and 28 is a second drain conduit 30 similar to the conduit 20 and this conduit 30 delivers further removed iron particles and asbestos slurry to a pump 32 which forces these particles into a third series of cyclones employing cyclones 34 and 36 which are similar to the hereinbefore described cyclones. These are coupled to a common drain conduit 38 at their lower ends which finally drain away separated iron particles.

Makeup water inlet conduits 23 and 33 supply water to the pumps 22 and 32 respectively to dilute solid material collected in the respective conduits 20 and 30.

A conduit 40 communicating with the outlet of the cyclone 36 at the upper portion thereof, conducts a slurry of asbestos fibers upwardly and into the conduit 20 so that these fibers may be recycled through the cyclones 24, 26 and 28, while an outlet conduit 42 communicating with the upper outlet of the cyclone 28 conducts an asbestos fiber slurry to a recycle conduit 44 which recycles the asbestos slurry delivered from the cyclone 28 back into the pulper container 10 subsequently to again be pumped by the pump 12 through the initial series of cyclones 12, 16, 17, 18 and 19.

An outlet conduit 46 communicating with an upper portion of the cyclone 19 directs an asbestos slurry into a magnetizing assembly 48. This magnetizing assembly 48 is shown in detail in FIG. 2, wherein the conduit 46 is a hollow tubular conduit extending through an electrical winding 50 adapted to be energized to create an intense magnetic field in the area of the conduit 46 in order to coalesce small iron particles, and particularly the smallest of said particles. It will be understood by those skilled in the art that many of the particles of iron in the asbestos ore are very small, and by passing the slurry through the conduit 46 in the influence of the intense magnetic field induced by the winding 50 these small particles are forced to coalesce to form larger magnetic particles which are then subsequently trapped in the magnetic collector, as will be hereinafter described in detail.

Inasmuch as the winding 50 is highly energized to induce an intense magnetic field within and around the conduit 46 and the slurry passing therethrough, this winding may generate a substantial amount of heat, and accordingly a liquid heat exchanger 52 is conductively coupled to the winding 50, or any suitable means for heat transfer from the winding 50 may be provided. The exchanger 52 involves a helical flow passage for cooling liquid having an inlet 54 and an outlet 56. It will be understood by those skilled in the art that any suitable cooling or heat exchange means may be used in connection with the windings 50 to prevent critical temperatures from occuring therein.

As the asbestos fiber slurry passes through a bore 58 in the conduit 46, the small magnetic particles are caused to coalesce and the conduit 46 passes into an inlet conduit 60 of a magnetic collector 62. This magnetic collector 62 is disclosed in FIGS. 3 and 4 of the drawings.

The inlet conduit 60 of the magnetic collector 62 is provided with a bore 64 disposed to receive and conduct the asbestos fiber slurry and this conduit 60 is disposed in a helical form 66, as indicated in FIGS. 3 and 4 of the drawings, which extends to a hollow tubular outlet conductor portion 68. It will be understood that the hollow tubular conductor of the magnetic collector may be in other form, if desired, however the helical form disclosed may lend compactness to the structure of the collector.

Electro magnets 70 project into the bore 64 of the conduit 60 of the magnetic collector 62 and additional electro magnets 72 project into the bore 64 in opposed relation to the electro magnets 70. These electro magnets 70 and 72 are provided with respective windings 74 and 76, which may be energized with direct current in order to collect iron particles from the slurry passing through the bore 64 of the conduit 60. It will be seen that the magnets are arranged in spaced relation with each other. Each bar of each electro magnet is spaced relative to the other so that a pocket exists between each bar of each electro magnet, and due to the direction of flow of the slurry between the ends or points of bars 70 and 72, fluid turbulence is created between the ends of the bars. This fluid turbulence in the form of eddies occurs between the bars and in the pockets, hereinbefore described, while magnetic flux is presumed to flow from north to south so that the magnetic flux circulation is in the same direction as the eddy currents of the fluid of the slurry to thereby assist in the actual collection of iron particles by contact with the bars of the electro magnets 70 and 72.

These bars are provided with substantially sharp points 78 in close adjacent relationship to each other to minimize the distance between the poles of the magnets in order that the flux between the points is at a maximum intensity when the iron is fully saturated as to its magnetic capacity, such being around 12,000 gaus.

This saturation of iron is produced by electromagnetization of the bars when the windings 74 and 76 of the electro magnets 70 and 72 are energized.

Each set of magnets comprises a plurality of bars, as shown in FIG. 3 of the drawings, and each plurality of electro magnets 70 and 72 may be similar.

The illustration of FIGS. 3 and 4 discloses one set of each of the electro magnets 70 and 72, each having a plurality of bars therein, and each having a plurality of windings 74 and 76. However, it will be apparent to those skilled in the art that numerous assemblies of these electro magnets 70 and 72 may be installed around the spiral structure of the collector 62 in order to accomplish maximum collective capacity of the collector in accordance with the teachings of the invention. Therefore, FIGS. 3 and 4 are merely disclosures of an example of the physical structure of the magnetic collector, but are limited with respect to the number of magnets disclosed in order to facilitate the illustration.

As the slurry is conducted through the bore 64 of the conductor 60, it passes around the spiral or helical path of the conduit 60, and due to constant change of direction of the slurry and due to turbulence created among the series of groups of electro magnets 70 and 72, all of the fibers of the slurry are forced to change direction many times through the various eddy currents of pockets and to contact the electro magnets and thereby be relieved of any iron particles or magnetite clinging thereto. Thus, the very smallest iron particles clinging to the fibers may be attracted and held by the electro magnets 70 and 72.

Periodically, when the magnets have become substantially loaded with a mixture of fiber and iron, a timed alternator may be coupled to the windings 74 and 76 of the electro magnets 70 and 72, respectively, and the direct current may be reversed at an increasing frequency until all of the iron is demagnetized, as well as the magnets, and then clear water is run through the bore 64 of the spiral shaped collector 62 at high velocity so that the iron and magnetite particles may be washed out of the magnets and flushed from the conduit, and this material flushed from the collector 62 is returned via a conduit 82 coupled to the conduit 44, which ultimately returns the fibers and iron to the container 10.

When the iron collector 62 is flushed, a valve 88 in the outlet conduit 68 is closed, while a drain valve 92 is opened, permitting the flushed out iron particles and fibers to pass through a conduit 94 back to the conduit 44 so that the fibers and iron particles may be recycled back into the container and pulper 10. This pulper is provided with a drain valve 94 at its lower portion to permit the removal of iron particles therefrom from time to time. Additionally, this drain valve 94 may be used to remove other deleterious matter if desired.

The valve 88, when closed, permits flow from the conduit 46 to pass through the collector 62 and out through the valve 92 and conduit 94 and through the conduit 44 to the container 10. Thus, when the iron particles are demagnetized, as hereinbefore described, they may be flushed out of the collector 62 along with the fibers which have been collected therein.

Figure 9:
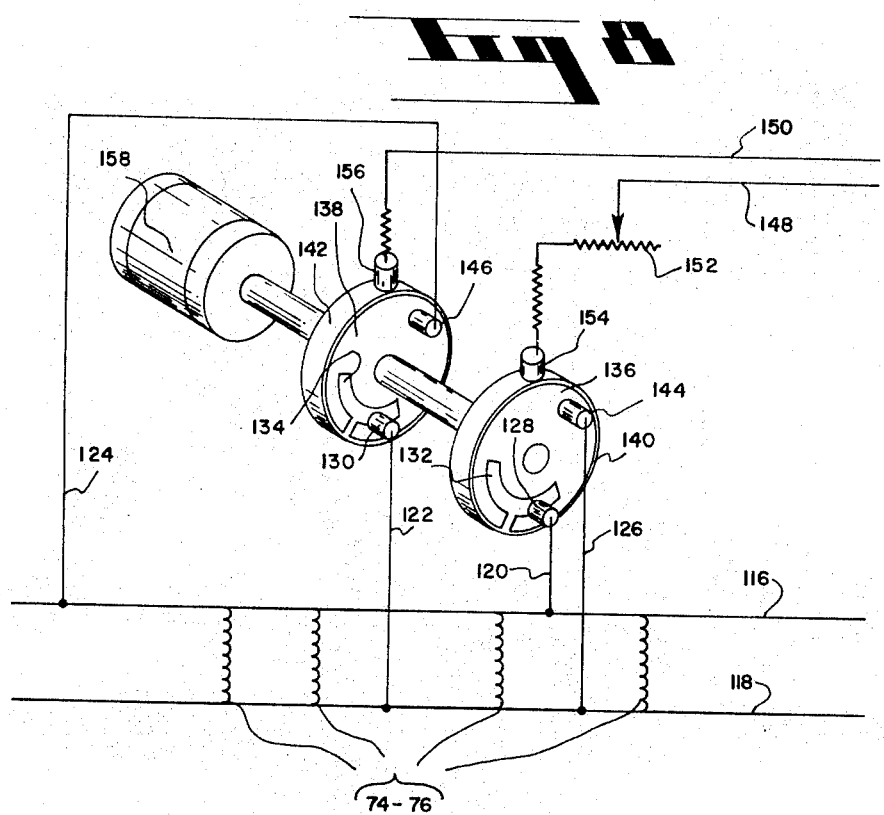
FIG. 9 is a diagrammatic view of a device similar to that shown in FIG. 8 but being a modification thereof.

In accordance with the present invention, the demagnetizing process used to demagnetize the electro magnets 70 and 72 involves equipment as shown in FIGS. 8 and 9 of the drawings, such being important in not only demagetizing the electro magnets 70 and 72 and the iron particles, but particularly magnetite which is relatively difficult to demagnetize and remove from the electro magnet bars 70 and 72. The magnetite has a very high residual magnetism, and after it has been magnetized by the magnetizing means 48 and by the electro magnets 70 and 72 it has a very high residual magnetism and requires a rather strenuous demagnetization process. Accordingly, reference is made to FIG. 8 of the drawings, wherein the electro magnetic windings 74 and 76 are coupled to conductors 98 and 100 connected by conductors 102 and 104, respectively, energized through a motor driven reversing switch 106 coupled to an alternating current supply 108. A rheostat 110 in the A.C. supply is disposed to vary current, while a switch 112 is used to disconnect the A.C. supply, and a switch 114 is used to couple the direct current circuit to the electro magnets 74 and 76 for normal electro magnetic collection, as hereinbefore described.

It will be seen that the arrangement shown in FIG. 8 provides an alternating current coupling through the switch 112 to alternately reverse polarity and gradually change the magnitude of energization which completely demagnetizes the electro magnetic bars 72 and 70, as well as the iron and magnetite particles collected by the electro magnets in the collector 62.

As a modification of the invention, the electro magnetic windings 74 and 76 are coupled to conductors 116 and 118 connected respectively to conductors 120 and 122. Also respectively connected to conductors 124 and 126. The conductors 120 and 122 are connected to brushes 128 and 130 which engage segments 132 and 134 of rotating discs 136 and 138 having slip rings 140 and 142 connected to the segments 132 and 134, respectively. Additionally brushes 144 and 146 are alternately contactable by the segments 132 and 134, and these brushes 144 and 146 are connected to the conductors 126 and 124, respectively. An electrical current supply is provided through conductors 148 and 150, a rheostat 152 being disposed between the conductor 148 and a brush 154 engaging the slip ring 140. Another brush 156 is connected to slip ring 142 and the conductor 150.

A variable speed motor 158 is disposed to rotate the discs 136 and 138 alternately to reverse polarity of electrical energy conducted to the windings 74 and 76, and the reversal of this polarity may be varied in frequency by the variable speed motor as its speed changes, and further, the magnitude of such energy being alternately supplied at reverse polarity may be varied by means of the rheostat 152. Consequently, it will be appreciated that the electro magnets 70 and 72 may be thoroughly demagnetized together with iron particles and magnetite collected thereon. Thus, the flushing of the magnetic collector 62 may be greatly facilitated.

After the slurry has passed through the magnetic collector and is delivered from the outlet conduit 68, the material passes through a conduit 160 into a thickener tank 162 wherein a coagulating agent may be present. This coagulating agent may be any one of various well known thickening or coagulating agents and may be, as for example, one of the long chain acrylic compounds normally used in this general process for settling particles in a slurry. Accordingly, the thickener tank is used to settle the asbestos fibers to the bottom thereof from which the fibers are drawn through an outlet conduit 164 communicating with the bottom of the tank 162. This conduit 164 passes to an inlet 166 of a filter 168. Any equivalent device may be used, as for example, any means for filtering the water from the asbestos fibers. Such device may include a rotary drum filter, a leaf filter, a decker or other device generally used in the chemical industry for the removal of water from pulp, such as asbestos or other fibers.

It has been found that a conventional couch roll on the filter reduces water content greatly, and thus relieves the load on the drier.

After the fibers have been removed from the filter 168 they pass on a suitable conveyor 170 to a position between adjacent rollers 172 and 174. These rollers 172 and 174 may be resilient pressure type wringer rollers similar to a conventional domestic wringer normally used for wringing water from clothes. These rollers 172 and 174 may be spring loaded toward each other so their peripheries are in compression, and when the asbestos fibers are passed between these rollers the water is wrung therefrom and conducted by a conduit 176 to the inlet of a pump 178 which delivers slurry liquid back into the conduit 44 hereinbefore described. Additionally, water from the filter 168 is also carried away by the conduit 176.

When the asbestos sheet passes from the filter 168 on the conveyor 170 and passes between the rollers 172 and 174, great pressure may be applied and the resultant ribbon of asbestos emerging beyond the rollers 172 and 174 at 180 may appear much the same as a paper towel, and may contain as little as 25 or 30 percent water by weight. This ribbon of asbestos, designated 180, is then introduced into a drier 182 which may be similar to a conventional roto-louver or a raw cotton drier. When the asbestos emerges from the drier 182 it may be devoid of moisture down to a desired level, and then it may be passed through any conventional fiber opening mill 184, such as used in the asbestos industry. The asbestos fibers then may be bagged or packaged ready for customers. Further, it may be desirable to bale the fibers or package them in any suitable manner depending upon the industry to which these fibers are supplied.

In the modification as shown in FIGS. 5, 6 and 7 of the drawings, we have shown a magnetic separator which may be used in a similar manner to the separator 62 hereinbefore described. This modified structure includes a slurry inlet conduit 190 disposed in the same position as the inlet conduit 60 shown in FIG. 3 of the drawings. This conduit 190 delivers asbestos fiber slurry into a receiving cavity 192 communicating with a rotating paddle type feeder 194 which distributes the feed longitudinally across the cup shaped casing 196 concentrically located with respect to a rotating drum 198 carrying magnets 200 on the periphery thereof. The feeder rotor 194 is rotated by a variable speed motor 202 and the drum 198 is rotated by a motor 204 having a reduction gear box 206 in connection therewith.

As the fiber and slurry passes in the cup shaped receptacle 196 concentric with the periphery of the drum 198 on which the magnets 200 are disposed, the magnetic attraction of the magnets 200 sweep the iron particles from the fibers and the axis of the drum 198 may be adjusted so that the periphery of the drum 198, hence the magnets 200, may be adjusted relative to the inner wall 208 of the cup shaped receptacle 196. Thus, the control of feed by the feeder 194 and the spacing of the periphery of the drum 198 and the magnets 200 relative to the inner surface 208 of the receptacle 196 provides for very intimate contact of the magnets 200 with fibers and iron particles attached thereto.

As the drum 198 rotates in a direction of arrows A in FIG. 7 of the drawings, the asbestos fibers are delivered over an overflow lip 210 of the receptacle 196 and gravitate into a launder 212 communicating with the outlet conduit 68.

A pair of spray nozzles 214 and 216 are directed downwardly toward the periphery of the drum 198 and the magnets 200, and liquid may be supplied under high pressure to impinge upon the magnets 200 and remove iron particles and asbestos collected thereon. Such flushing of the magnets 200 by the nozzles 214 and 216 may be periodically accomplished as hereinbefore described.

It will be obvious to those skilled in the art that various modifications of the present invention may be resorted to in a manner limited only by a just interpretation of the following claims.

We claim:
1. A process for removing iron from asbestos ore comprising the steps of mechanically reducing asbestos ore to a pulp state in a liquid to form a slurry of asbestos fibers; said asbestos fibers and said liquid in said slurry ranging in proportions by weight from 1 to 40 asbestos fibers and liquid, respectively, to 1 to 100; then forcing said slurry at high velocity through a cyclone separator means and moving said slurry in a manner to cause separation of iron particles from the fibers of said pulp due to a difference in specific gravity between the iron and the fibers, whereby a substantial portion of the heavier iron particles are separated from said fibers; then passing said slurry with the fibers from which said portion of the heavier iron particles have been separated through an intense magnetic field to thereby magnetize unseparated particles of iron, to thereby force said magnetized iron particles in the slurry magnetically to coalesce, thereby forming relatively larger magnetic particles in said slurry; then passing said slurry carrying said relatively larger particles into contact with collector magnets and thereby collecting said coalesced particles thereon and thus removing coalesced particles from said fibers, then filtering said asbestos fibers from said slurry; and then drying said fibers.

2. A process for removing iron from asbestos ore comprising the steps of mechanically reducing asbestos ore to a pulp state in a liquid having dispersing reagents therein which chemically loosens iron and minerals from the fibers of the asbestos thereby forming a slurry of relatively free asbestos fibers; said asbestos fibers and said liquid in said slurry ranging in proportions by weight from 1 to 40 asbestos fibers and liquid, respectively, to 1 to 100; then forcing said slurry at high velocity through a separator means and moving said slurry in a manner to cause separation of iron particles from the fibers of said pulp due to a difference in specific gravity between the iron and the fibers, whereby a substantial portion of the heavier iron particles are separated from said fibers; then passing said slurry with the fibers from which said portion of the heavier iron particles have been separated through an intense magnetic field to thereby magnetize unseparated particles of iron, to thereby force said magnetized iron particles in the slurry magnetically to coalesce, thereby forming relatively large magnetic particles in said slurry; then passing said slurry carrying said relatively larger particles into contact with collector magnets and thereby collecting said coalesced particles thereon and thus removing coalesced particles from said fibers; then filtering said asbestos fibers from said slurry and then drying said fibers.

3. A process for removing iron from asbestos ore comprising the steps of mechanically reducing asbestos ore to pulp state in a liquid to form a slurry of asbestos fibers; then forcing said slurry at high velocity through a separator means and moving the slurry in a manner to cause separation of iron particles from the fibers of said pulp due to a difference in specific gravity between the iron and the fibers, whereby a substantial portion of the heavier iron particles are separated from the fibers; then passing said slurry with the fibers from which said portion of the heavier iron particles have been separated through an intense magnetic field to thereby magnetize unseparated particles of iron, to thereby force said magnetized iron particles in the slurry magnetically to coalesce, thereby forming relatively larger magnetic particles in said slurry; then passing said slurry carrying said relatively larger magnetic particles into contact with current energized electromagnets and thereby collecting said coalesced particles thereon and thus removing coalesced particles from said fibers; then removing said asbestos fibers from said slurry and then drying said fibers.

4. A process for removing iron from asbestos ore comprising the steps of mechanically reducing asbestos ore to a pulp state in a liquid to form a slurry of asbestos fibers; then forcing said slurry at high velocity through a separator means and moving said slurry in a manner to cause separation of iron particles from the fibers of said pulp due to a difference in specific gravity between the iron and the fibers, whereby a substantial portion of the heavier iron particles are separated from said fibers; then passing said slurry with the fibers from which said portion of the heavier iron particles have been separated through an intense magnetic field to thereby magnetize unseparated particles of iron, to thereby force said magnetized iron particles in the slurry magnetically to coalesce, thereby forming relatively larger magnetic particles in said slurry; then passing said slurry carrying said relatively larger particles into contact with collector magnets and thereby collecting said coalesced particles thereon and thus removing coalesced particles from said fibers, then passing said slurry to a settling tank containing a coagulating agent and permitting the slurry to settle therein.

5. A process for removing iron from asbestos ore comprising the steps of mechanically reducing asbestos ore to a pulp state in a liquid to form a slurry of asbestos fibers; then forcing said slurry at high velocity through a separator means and moving said slurry in a manner to cause separation of iron particles from the fibers of said pulp due to a difference in specific gravity between the iron and the fibers, whereby a substantial portion of the heavier iron particles are separated from the fibers; then passing said slurry with the fibers from which said portion of the heavier iron particles have been separated through an intense magnetic field to thereby magnetize unseparated particles of iron, to thereby force said magnetized iron particles in the slurry magnetically to coalesce, thereby forming relatively large magnetic particles in said slurry; then passing said slurry carrying said relatively larger particles into contact with collector magnets and thereby collecting said coalesced particles thereon and thus removing coalesced particles from said fibers; then filtering said asbestos fibers from said slurry; then passing said fibers between pressure wringer rollers to remove a major amount of liquid therefrom; and then drying said fibers.

6. A process for removing iron from asbestos ore comprising the steps of mechanically reducing asbestos ore to a pulp state in a liquid to form a slurry of asbestos fibers; said asbestos fibers and said liquid in said slurry ranging in proportions by weight from 1 to 40 asbestos fibers and liquid, respectively, to 1 to 100; then forcing said slurry at high velocity through a cyclone separator means and moving said slurry in a manner to cause separation of iron particles from the fibers of said pulp due to a difference in specific gravity between the iron and the fibers, whereby a substantial portion of the heavier iron particles are separated from said fibers; then passing said slurry with the fibers from which said portion of the heavier iron particles have been separated through an intense magnetic field to thereby magnetize unseparated particles of iron, to thereby force said magnetized iron particles in the slurry magnetically to coalesce, thereby forming relatively larger magnetic particles in said slurry; then passing said slurry carrying said relatively larger particles into contact with collector magnets and thereby collecting said coalesced particles thereon and thus removing coalesced particles from said fibers, then filtering said asbestos fibers from said slurry; and then drying said fibers; and then milling said fibers.

7. A process for removing iron from asbestos ore comprising the steps of mechanically reducing asbestos ore to a pulp state in a liquid to form a slurry of asbestos fibers; then forcing said slurry at high velocity through a separator means and moving the slurry in a manner to cause separation of iron particles from the fibers of said pulp due to a difference in specific gravity between the iron and the fibers, whereby a substantial portion of the heavier iron particles are separated from the fibers; then passing said slurry with the fibers from which said portion of the heavier iron particles have been separated through an intense magnetic field to thereby magnetize unseparated particles of iron, to thereby force said magnetized iron particles in the slurry magnetically to coalesce, thereby forming relatively larger magnetic particles in said slurry; then passing said slurry carrying said relatively larger magnetic particles into contact with current energized electromagnets and thereby collecting said coalesced particles thereon and thus removing coalesced particles from said fibers; then removing said asbestos fibers from said slurry and then drying said fibers; intermittently energizing said electromagnets with reverse polarity to demagnetize said magnets and iron particles collected thereon; then flushing said electromagnets to remove said iron particles and fibers collected thereon.

8. A process for removing iron from asbestos ore comprising the steps of mechanically reducing asbestos ore to a pulp state in a liquid to form a slurry of asbestos fibers; then forcing said slurry at high velocity through a separator means and moving the slurry in a manner to cause separation of iron particles from the fibers of said pulp due to a difference in specific gravity between the iron and the fibers, whereby a substantial portion of the heavier iron particles are separated from the fibers; then passing said slurry with the fibers from which said portion of the heavier iron particles have been separated through an intense magnetic field to thereby magnetize unseparated particles of iron, to thereby force said magnetized iron particles in the slurry magnetically to coalesce, thereby forming relatively larger magnetic particles in said slurry; then passing said slurry carrying said relatively larger magnetic particles into contact with current energized electromagnets and thereby collecting said coalesced particles thereon and thus removing coalesced particles from said fibers; then removing said asbestos fibers from said slurry and then drying said fibers; intermittently energizing said electromagnets with reverse polarity to demagnetize said magnets and iron particles collected thereon; then flushing said electromagnets to remove said iron particles and fibers collected thereon; and then recycling the last mentioned iron particles and fibers into said first mentioned separator means.

9. A process for removing iron from asbestos ore comprising the steps of mechanically reducing asbestos ore to a pulp state in a liquid to form a slurry of asbestos fibers; then forcing said slurry at high velocity through a separator means and moving the slurry in a manner to cause separation of iron particles from the fibers of said pulp due to a difference in specific gravity between the iron and the fibers, whereby a substantial portion of the heavier iron particles are separated from the fibers; then passing said slurry with the fibers from which said portion of the heavier iron particles have been separated through an intense magnetic field to thereby magnetize unseparated particles of iron, to thereby force said magnetized iron particles in the slurry magnetically to coalesce, thereby forming relatively larger magnetic particles in said slurry; then passing said slurry carrying said relatively larger magnetic particles into contact with current energized electromagnets and thereby collecting said coalesced particles thereon and thus removing coalesced particles from said fibers; then removing said asbestos fibers from said slurry and then drying said fibers; intermittently energizing said electromagnets with reverse polarity to demagnetize said magnets and iron particles collected thereon; then flushing said electromagnets to remove said iron particles and fibers collected thereon; and then recycling the last mentioned iron particles and fibers into said first mentioned separator means; and gravitationally removing iron from said first mentioned separator means.

10. A process for removing iron from asbestos ore comprising the steps of mechanically reducing asbestos ore to a pulp state in a liquid to form a slurry of asbestos fibers; then forcing said slurry at high velocity through a separator means and moving the slurry in a manner to cause separation of iron particles from the fibers of said pulp due to a difference in specific gravity between the iron and the fibers, whereby a substantial portion of the heavier iron particles are separated from the fibers; then passing said slurry with the fibers from which said portion of the heavier iron particles have been separated through an intense magnetic field to thereby magnetize unseparated particles of iron, to thereby force said magnetized iron particles in the slurry magnetically to coalesce, thereby forming relatively larger magnetic particles in said slurry; then passing said slurry carrying said relatively larger magnetic particles into contact with current energized electromagnets and thereby collecting said coalesced particles thereon and thus removing coalesced particles from said fibers; then removing said asbestos fibers from said slurry and then drying said fibers; intermittently energizing said electromagnets with reverse polarity and increasing the frequency of polarity reversal to demagnetize said magnets and iron particles collected thereon; then flushing said electromagnets to remove said iron particles and fibers collected thereon.

11. In an apparatus for removing iron from asbestos ore the combination of: means for pulping asbestos ore comprising a container adapted to contain a liquid slurry of asbestos fibers and chemical dispersing reagents; a cyclone separator means adjacent said container and disposed to receive said slurry therefrom; means for forcing said slurry at high velocity from said container into said separator whereby particles of iron are separated in accordance with a difference in specific gravity thereof with respect to the asbestos fibers; an outlet for said separator means; a flow passage means communicating with said outlet; a magnetizing means adjacent said flow passage means capable of creating an intense magnetic field for magnetizing small particles of iron moving through said flow passage means; a magnetic iron collector having a flow passage therein and communicating with said last mentioned flow passage to receive said slurry therefrom; magnets in said magnetic iron collector communicating with said flow passage therein, said magnets being electromagnets; means for electromagnetically energizing said magnets; means for electromagnetically reversing magnetic polarity of said magnets to demagnetize said magnets and iron particles collected thereon; means for removing and conducting said slurry from said magnetic iron collector; a coagulating agent container communicating with and disposed to receive said slurry from said last mentioned means; conduit means communicating with the bottom of said last mentioned container for withdrawing asbestos fibers therefrom; a fiber and liquid separator communicating with and disposed to receive wet fibers from said conduit means an outlet for said last mentioned separator disposed to deliver damp asbestos fibers therefrom.

12. In an apparatus for removing iron from asbestos ore the combination of: means for pulping asbestos ore comprising a container adapted to contain a liquid slurry of asbestos fibers and chemical dispersing reagents; a cyclone separator means adjacent said container and disposed to receive said slurry therefrom; means for forcing said slurry at high velocity from said container into said separator whereby particles of iron are separated in accordance with a difference in specific gravity thereof with respect to the asbestos fibers; an outlet for said separator means; a flow passage means communicating with said outlet; a magnetizing means adjacent said flow passage means capable of creating an intense magnetic field for magnetizing small particles of iron moving through said flow passage means; a magnetic iron collector having a flow passage therein and communicating with said last mentioned flow passage to receive said slurry therefrom; magnets in said magnetic iron collector communicating with said flow passage therein; said magnets being electromagnets; means for electromagnetically energizing said magnets; means for electromagnetically reversing said magnets; means for electromagnetically reversing magnetic polarity of said magnets to demagnetize said magnets and iron particles collected thereon; means for removing and conducting said slurry from said magnetic iron collector; a coagulating agent container communicating with and disposed to receive said slurry from said last mentioned means; conduit means communicating with the bottom of said last mentioned container for withdrawing asbestos fibers therefrom; a fiber and liquid separator communicating with and disposed to reecive wet fibers from said conduit means; an outlet for said last mentioned separator disposed to deliver damp asbestos fibers therefrom; wringer rollers loaded together at their peripheries and disposed to receive asbestos fibers from said last mentioned outlet.

13. In an apparatus for removing iron from asbestos ore the combination of: means for pulping asbestos ore comprising a container adapted to contain a liquid slurry of asbestos fibers and chemical dispersing reagents; a cyclone separator means adjacent said container and disposed to receive said slurry therefrom; means for forcing said slurry at high velocity from said container into said separator whereby particles of iron are separated in accordance with a difference in specific gravity thereof with respect to the asbestos fibers; an outlet for said separator means; a flow passage means communicating with said outlet; a magnetizing means adjacent said flow passage means capable of creating an intense magnetic field for magnetizing small particles of iron moving through said flow passage means; a magnetic iron collector having a flow passage therein and communicating with said last mentioned flow passage to receive said slurry therefrom; magnets in said magnetic iron collector communicating with said flow passage therein; said magnets being electromagnets; means for electromagnetically energizing said magnets; means for electromagnetically reversing magnetic polarity of said magnets to demagnetize said magnets and iron particles collected thereon; means for removing and conducting said slurry from said magnetic iron collector; a coagulating agent container communicating with and disposed to receive said slurry from said last mentioned means; conduit means communicating with the bottom of said last mentioned container for withdrawing asbestos fibers therefrom; a fiber and liquid separator communicating with and disposed to receive wet fibers from said conduit means; an outlet for said last mentioned separator disposed to deliver damp asbestos fibers therefrom; wringer rollers loaded together at their peripheries and disposed to receive asbestos fibers from said last mentioned outlet; a heated dryer disposed to receive a ribbon of asbestos fibers from said wringer rollers.

14. In an apparatus for removing iron from asbestos ore the combination of: means for pulping asbestos ore comprising a container adapted to contain a liquid slurry of asbestos fibers and chemical dispersing reagents; a cyclone separator means adjacent said container and disposed to receive said slurry therefrom; means for forcing said slurry at high velocity from said container into said separator whereby particles of iron are separated in accordance with a difference in specific gravity thereof with respect to the asbestos fibers; an outlet for said separator means; a flow passage means communicating with said outlet; a magnetizing means adjacent said flow passage means capable of creating an intense magnetic field for magnetizing small particles of iron moving through said flow passage means; a magnetic iron collector having a flow passage therein and communicating with said last mentioned flow passage to receive said slurry therefrom; magnets in said magnetic iron collector communicating with said flow passage therein; said magnets being electromagnets; means for electromagnetically energizing said magnets; means for electromagnetically reversing magnetic polarity of said magnets to demagnetize said magnets and iron particles collected thereon; means for removing and conducting said slurry from said magentic iron collector; a coagulating agent container communicating with and disposed to receive said slurry from said last mentioned means; conduit means communicating with the bottom of said last mentioned container for withdrawing asbestos fibers therefrom; a fiber and liquid separator communicating with and disposed to reecive wet fibers from said conduit means; an outlet for said last mentioned separator disposed to deliver damp asbestos fibers therefrom; wringer rollers loaded together at their peripheries and disposed to receive asbestos fibers from said last mentioned outlet; a heated dryer disposed to receive a ribbon of asbestos fibers from said wringer rollers; and a mill disposed to receive the dried asbestos ribbon of fibers from said heated dryer.

15. A process for removing iron from asbestos ore comprising the steps of mechanically reducing asbestos ore to a pulp state in a liquid having dispersing reagents therein which chemically loosens iron and minerals from the fibers of the asbestos thereby forming a slurry of relatively free asbestos fibers; said asbestos fibers and said liquid in said slurry ranging in proportions by weight from 1 to 40 asbestos fibers and liquid, respectively, to 1 to 100; then forcing said slurry at high velocity through a separator means and moving said slurry in a manner to cause separation of iron particles from the fibers of said pulp due to a difference in specific gravity between the iron and the fibers, whereby a substantial portion of the heavier iron particles are separated from said fibers; then passing said slurry with the fibers from which said portion of the heavier iron particles have been separated through an intense magnetic field to thereby magnetize unseparatd particles of iron, to thereby force iron particles in the slurry magnetically to coalesce, thereby forming relatively large magnetic particles in said slurry; then passing said slurry carrying said relatively larger particles into contact with collector magnets and thereby collecting said coalesced particles thereon and thus removing coalesced particles from said fibers; then filtering said asbestos fibers from said slurry and then drying said fibers; and gravitationally removing iron from said first mentioned separator means.

References Cited

UNITED STATES PATENTS

| | | | |
|---|---|---|---|
| 460,962 | 10/1891 | Gouyard | 210—222 X |
| 1,684,365 | 9/1928 | Dolbear | 209—2 X |
| 1,778,910 | 10/1930 | Niven | 210—223 |
| 2,075,466 | 3/1937 | Queneau | 209—2 X |
| 2,377,524 | 6/1945 | Samson | 209—211 |
| 2,500,154 | 3/1950 | Crockett | 209—40 X |
| 2,504,944 | 4/1950 | Atkinson | 209—211 |
| 2,607,492 | 8/1952 | Anders | 210—222 |
| 2,662,639 | 12/1953 | Novak | 209—2 |
| 2,685,825 | 8/1954 | Novak | 241—4 |
| 2,692,677 | 10/1954 | Bosqui | 209—39 |
| 2,754,968 | 7/1956 | Vegter | 209—211 |
| 2,976,995 | 3/1961 | Ferrer | 209—223 |
| 3,021,007 | 2/1962 | Jones | 209—232 |
| 3,034,859 | 5/1962 | Gunn | 241—4 |
| 3,162,380 | 12/1964 | Cohn | 241—4 |

FOREIGN PATENTS

| | | |
|---|---|---|
| 205,555 | 1/1957 | Australia. |
| 251,470 | 5/1964 | Australia. |

FRANK W. LUTTER, *Primary Examiner.*

HARRY B. THORNTON, *Examiner.*

R. HALPER, *Assistant Examiner.*